United States Patent Office 2,853,799
Patented Sept. 30, 1958

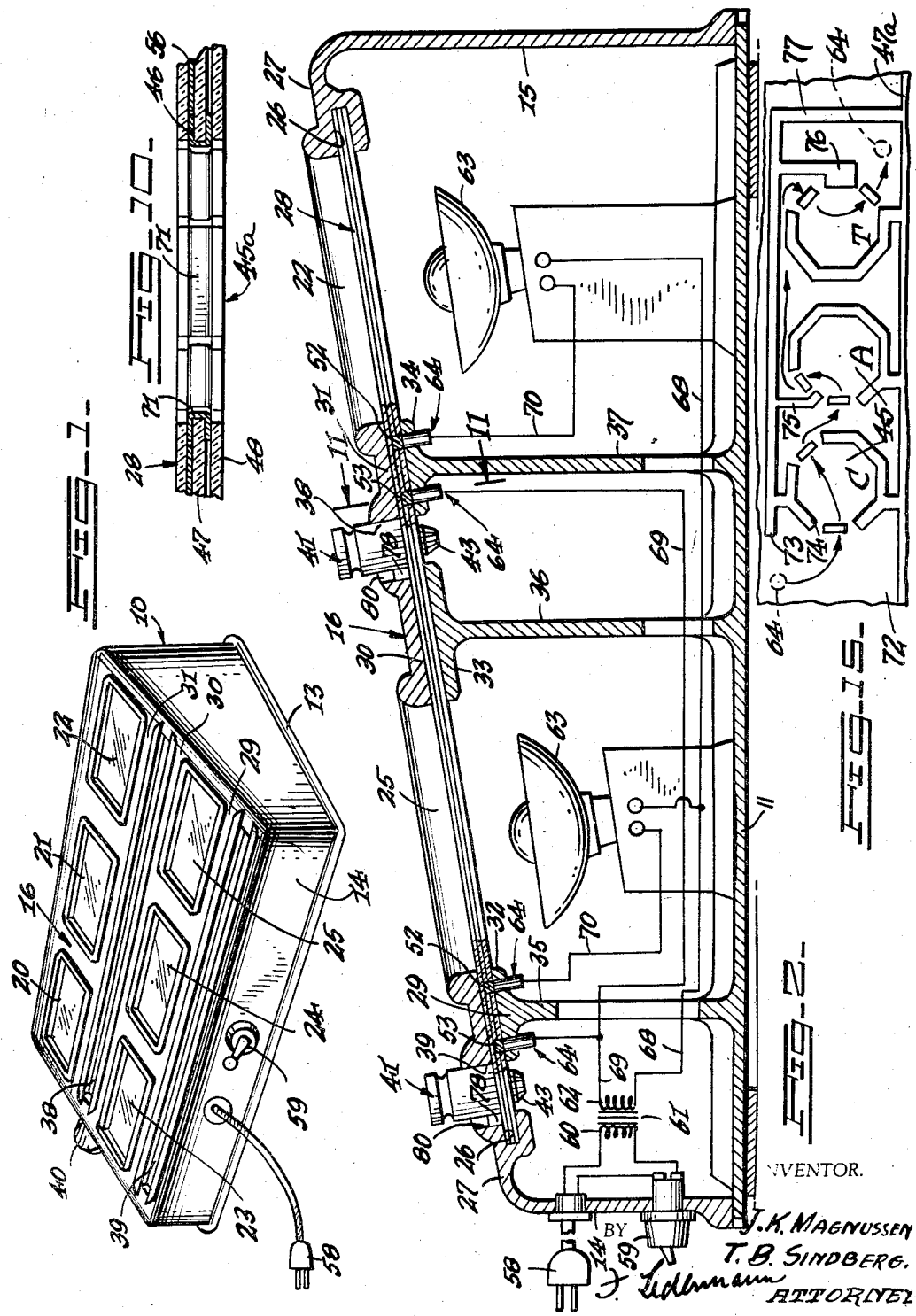

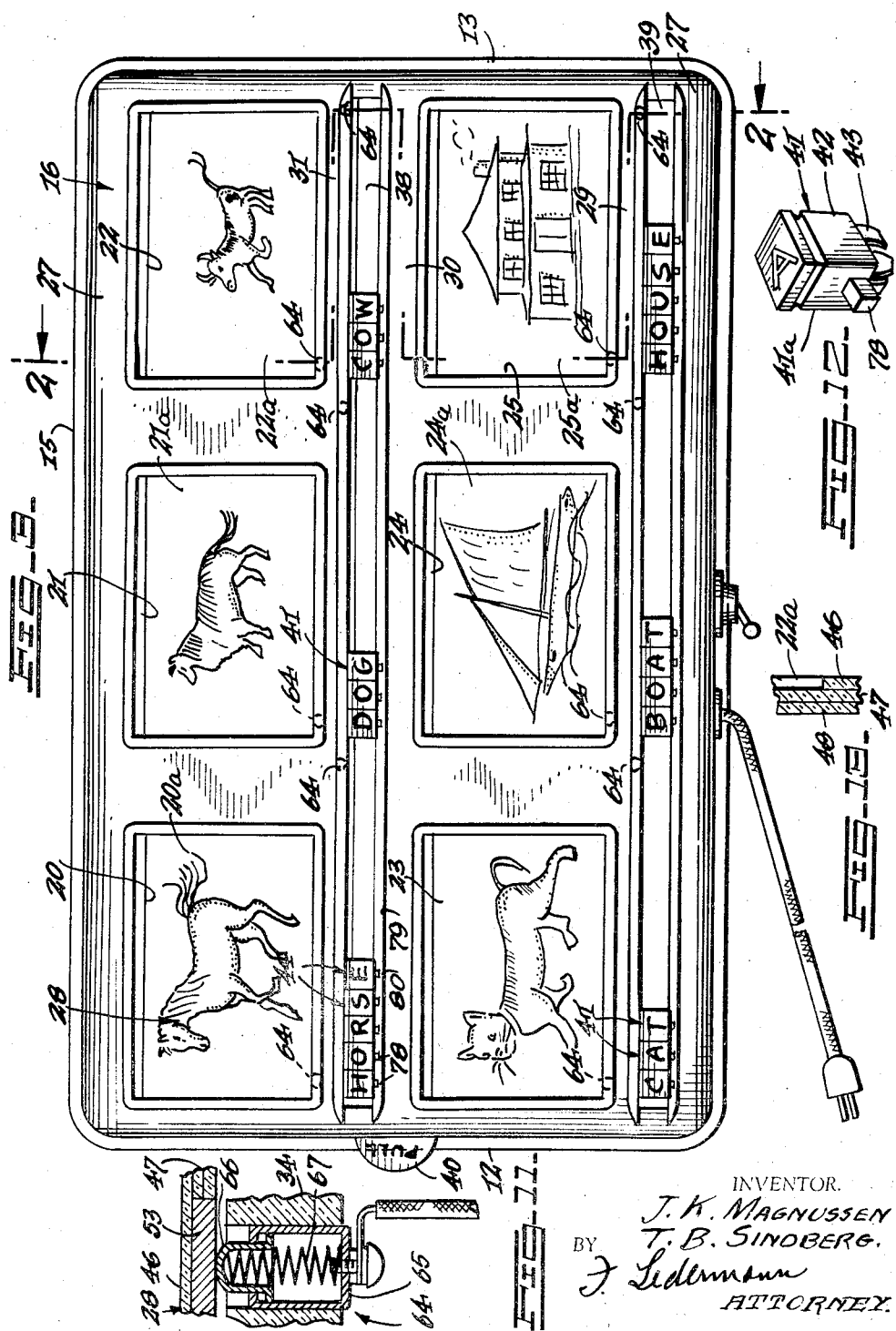

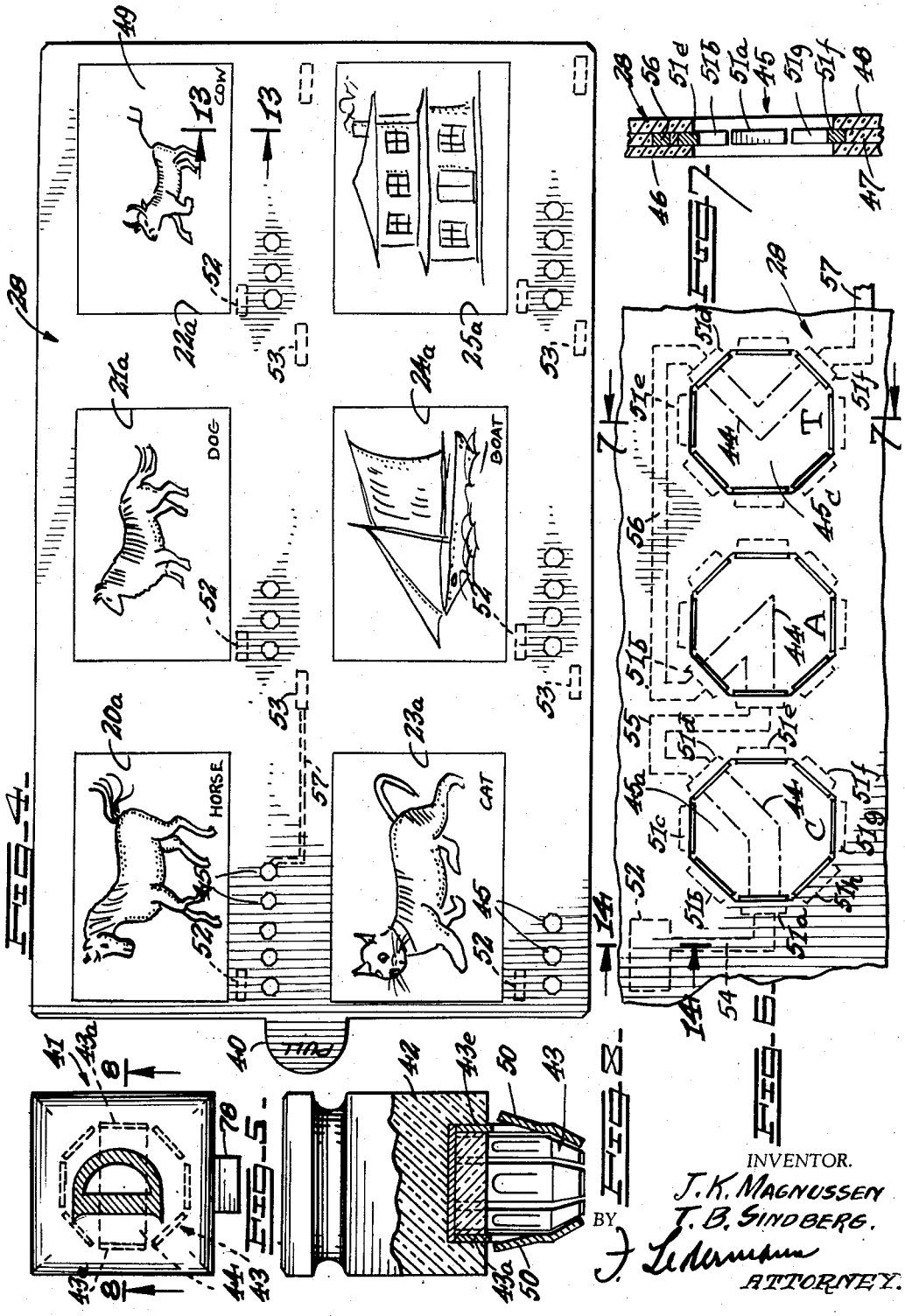

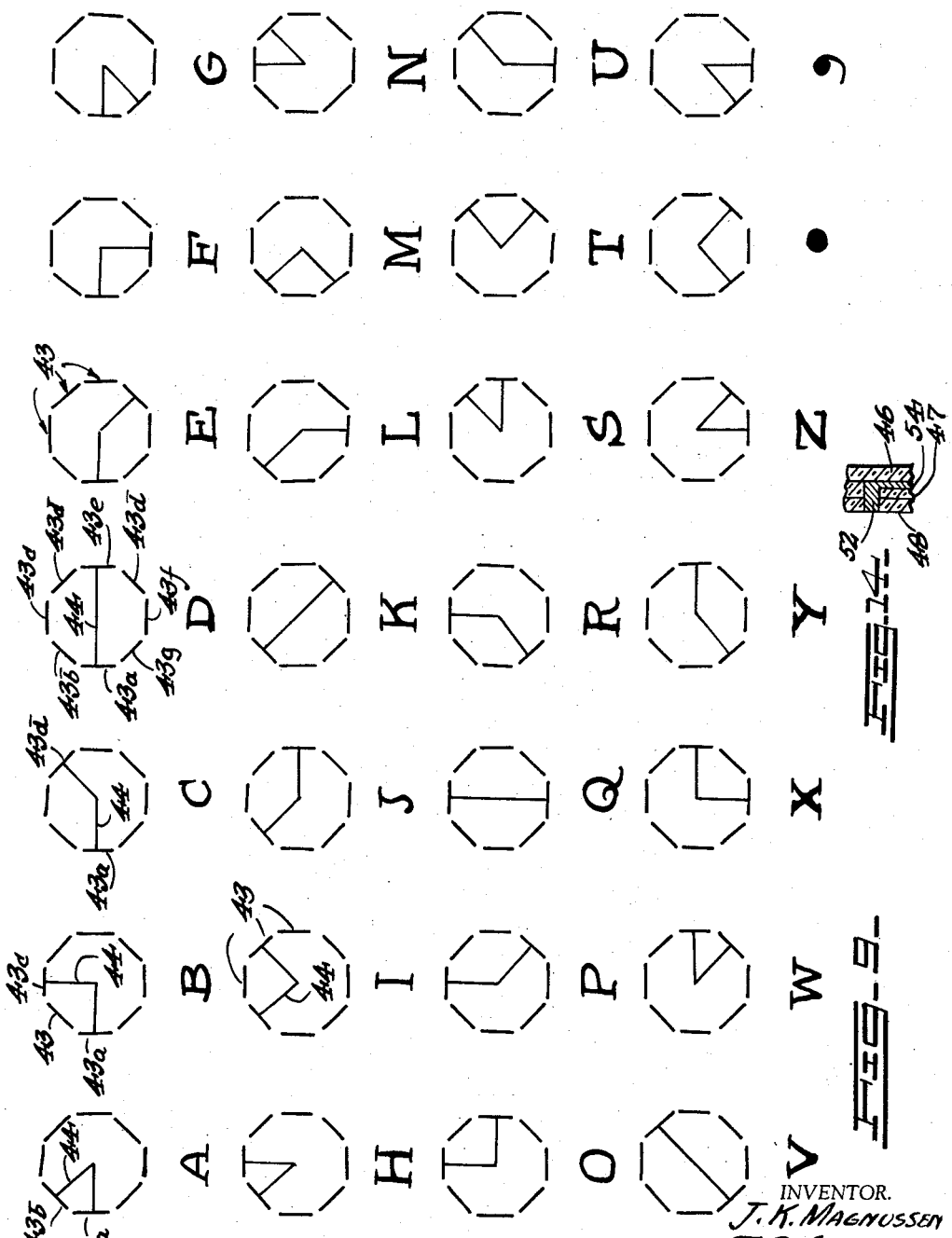

2,853,799
EDUCATIONAL QUESTION AND ANSWER DEVICE

John K. Magnussen, Brooklyn, and Torben B. Sindberg, New Hyde Park, N. Y.

Application September 19, 1956, Serial No. 610,742

12 Claims. (Cl. 35—9)

This invention relates to educational toys particularly adapted for small children who are learning to spell or to improve their spelling, although it may readily be modified or adapted as an aid in their learning of mathematics, as well as for other educational or entertainment purposes.

Another object of the invention is the provision of a number of block-like plugs equal to the number of letters in the alphabet and each having a different letter thereon, in combination with a card or the like having at least one series of sockets therein equal in number to the number of letters in a given word, the sockets being so electrically "wired," so to speak, that each will make electric contact in series with the others when the proper plug for each letter of the series is inserted thereinto, the plugs likewise being electrically "wired" so that only when all of the plugs are inserted into the series of sockets, with the letters on the plugs properly upright and with each plug in its proper socket, will the circuit through the plugs and sockets be completed. The circuit is further connected with a lamp positioned behind a pictorial representation of the object defined by the given word, the same representation being transparent so that the closing of the circuit through the lamp makes the representation visible to the child. Thus, before the representation of the object defined by the word is made visible to the child, he will have to be able to spell the word out. However, it may be desirable to have the picture of the horse visible before the child starts to insert the letter plugs, so that he may see the object whose name he is to spell out, and then when he has succeeded in the spelling out by proper insertion of the letter plugs, the automatic illumination of the picture will be the announcement of his success. In this case the card or slide bearing the picture would preferably be made translucent or, if transparent, the picture of the object would be made visible to the child at all times.

In order to prevent mere chance selection of the proper letter plugs by the child, as well as to prevent his proper selection of the plugs except by his being able to identify the letters, the plugs except for the letters thereon are all exactly alike in outward appearance.

In addition to plugs bearing letters of the alphabet, other plugs bearing different punctuation marks, not shown, may be provided, or plugs bearing numerals or other symbols, with the pictorial illustrations corresponding thereto. Numerous modifications and combinations are obviously possible, utilizing the underlying principles of the present invention.

The above broad as well as additional and more specific objects of the invention will be clarified in the following description wherein reference numerals refer to like-numbered parts on the accompanying drawings. It is particularly to be noted that the drawings are intended solely for the purpose of illustration and that it is therefore neither desired nor intended to limit the invention necessarily to any or all of the exact details of construction shown or described except insofar as they may be deemed essential to the invention.

Referring briefly to the drawings,

Fig. 1 is a perspective view of an educational toy embodying the features of the present invention.

Fig. 2 is a sectional view taken on the line 2—2 of Fig. 3, and includes a wiring diagram.

Fig. 3 is a plan view of the toy of Fig. 1.

Fig. 4 is a plan or top view of a specimen card or slide associated with the toy, such cards being supplyable with varied assortments of words and correlated pictorial representations.

Fig. 5 is a top plan view of one of the lettered plugs.

Fig. 6 is a fragmentary enlargement of Fig. 4.

Fig. 7 is a sectional view taken on the line 7—7 of Fig. 6.

Fig. 8 is a sectional view taken on the line 8—8 of Fig. 5.

Fig. 9 is a schematic representation of how a number of plugs each bearing a different letter of the alphabet and some bearing punctuation marks, may be "wired" so that each plug is wired differently from all of the others while they may all look exactly alike except for the symbols they bear.

Fig. 10 is a sectional view similar to Fig. 7 but showing a modified construction.

Fig. 11 is a sectional view taken on the line 11—11 of Fig. 2.

Fig. 12 is a perspective view of one of the symbol-bearing plugs.

Fig. 13 is a sectional view taken on the line 13—13 of Fig. 4.

Fig. 14 is a sectional view taken on the line 14—14 of Fig. 6.

Fig. 15 is a fragmentary enlargement of Fig. 4 but showing a modified structure as compared with that of Fig. 6.

Referring in detail to the drawings, the numeral 10 indicates a housing suitable for the educational toy of the present invention, comprising the base 11, side walls 12 and 13 which slope upward from front to rear, front wall 14, rear wall 15, and upwardly sloping top wall 16.

Spaced window openings, which may be provided as a single opening or in any desired number, are herein shown at 20, 21, 22, 23, 24 and 25, through the top wall, in two rows and three columns. The parallel top and bottom edges of the top wall are indicated at 27, Fig. 2. A groove 26 in which a plate, card or slide 28 may be slid through the top wall from one side of the housing (the left side, Fig. 1) through the top wall, is provided in each of the edges 27, the latter being thickened to provide for the groove. Forming part of the top wall are transverse strips 29, 30 and 31 which extend beyond the confines of the windows. To support the card 28, strips 32, 33 and 34, extending transversely also and supported on transverse partitions 35, 36, and 37, respectively, are provided, the strips 32, 33 and 34 being spaced below the strips 29, 30 and 31 a distance equal to the thickness of the said card or slide.

Between the strips 30 and 31, a transverse slot 38 is provided in the top wall 16, and between the strip 29 and the lower edge 27, a similar transverse slot 39 is provided in the wall 16.

The card 28 is preferably provided with a pull tab 40 so that it may readily be withdrawn from the grooves 26. The card has a number of translucent or transparent areas 20a, 21a, 22a, 23a, 24a, and 25a, each being so positioned thereon that, when the card is slid home under the top wall 16, each such area will be positioned under the window indicated by the same reference numeral without the subscript "a," as shown in Fig. 3.

A plurality of plugs 41 is provided, preferably square in cross-section and having a symbol, or legend, such as, by way of example, a letter of the alphabet, on the top thereof, the body 42 of the plugs being made of an insulating material, preferably a common plastic. Imbedded in and projecting below the plug are a plurality, preferably eight, of spring contact prongs 43, arranged in the form of an octagon. These prongs are all insulated from each other except that for each plug bearing a different letter a different pair of the prongs 43 are bridged by a strip of metal 44. For example, as indicated in the schematic diagram of Fig. 9, the plug for the letter "D" has the bridge, indicated diagrammatically at 44, joining opposite prongs 43a and 43e. For simplicity in describing the arrangement of the prongs in their bridge interconnections, let it be assumed that the prongs are numbered successively from 43a through 43g, reading clockwise and assuming the reader is looking down upon the plugs, with the letter thereon upright as it would appear on paper. Thus, for the letter "A" the bridge 44 joins prongs 43a and 43b; for the letter "B," the bridge joins prongs 43a and 43d; for the letter "C" the bridge joins prongs 43a and 43d, and so on. By a perusal of the octangularly arranged prongs 43 for all of the plugs represented in Fig. 9, it is apparent that for each letter or symbol a different pair of prongs is bridged, invisibly within the plug body as shown in Fig. 8.

Although different ways of constructing the card or slide 28 are possible, one simple and practical way is described as follows. Under each area 20a, 20b etc. a series of octagonal openings or sockets 45 is provided, equal in number to the number of letters in the word defining the object pictured in the area. For example, a horse will be pictured in the area 20a, so that there are five sockets 45 in a row therebelow. The sockets under the areas 21a and 22a are all in line with the sockets under the area 20a, and the sockets 45 under the areas 23a, 24a, and 25a are all in a line; the former line of sockets is positioned to appear under the slot 38 when the card is in the housing, and the latter line of sockets is adapted to appear under the slot 39, as shown in Fig. 3.

The slide 28 is formed of three sheets of insulating material superimposed on one another, including the top sheet or layer 46, the middle layer 47 and the bottom layer 48, with the sockets 45 cut through all the layers. The top layer 46 is opaque and has the areas 20a, 20b etc. cut out thereof, as shown in Fig. 13, so that a pictorial representation on the form of a card 49, Fig. 4 (but not shown in Fig. 13) may be mounted therein, the picture card being transparent or translucent. The layers 47 and 48 are also transparent or translucent. Of course, instead of cutting out the areas 20a, 20b etc., the layer 46 may simply have the pictorial representations imprinted thereon.

All cards are prepared in advance especially for the words which they are to contain, in of course any desired arrangement. For example, the card 28 shown bears certain words and their pictured representations. In order that the sockets 45 under any picture may be adaptable to receive the proper plugs bearing the letters that spell the word under the picture, and in their proper order, the sockets are "wired" in the card so that only the correct letter, positioned upright, will make it possible to provide a continuous electric circuit through all the letters of the word.

Each socket 45 is octagonal in outline so that it will receive the octagonally arranged prongs 43 of any plug 41 with the spring fingers 50 of the prongs resiliently in contact with the sides of the octagonal socket. The sides of the socket portion cut through the middle layer 47 are provided with metallic linings or contacts 51a, 51b, etc. through 51g, reading clockwise, Fig. 6, so that when a plug is properly inserted into a socket, prong 43a will contact lining 51a, prong 43b will contact lining 51b, etc. For the purpose of more clearly disclosing the invention, Fig. 6 also shows, in phantom, the bridges 44 of the plugs which are appropriate to the lettered plugs required to be inserted into the sockets to spell the desired word, which in this case is "Cat." It will be noted that when the plug for the letter "C" is inserted in the socket 45a, Fig. 6, its bridge 44 will close the circuit path between socket lining 51a and socket lining 51d, also the plug for the letter "A" in socket 45b will cause its bridge to close the path between socket linings 51a and 51b, and finally that the plug for the letter "T" will have its bridge closing the gap between the socket linings 51d and 51f. Under each area 20a etc. and above the row of sockets 45 under the area, a metallic contact 52 is imbedded in the layers 48 and 47 and is exposed through the bottom of the former. These contacts 52 are in a transverse line along the card 28; likewise, a second line of such contacts is similarly provided, shown at 53, each spaced below the sockets 45. Conductor strips are provided to join the appropriate socket edge linings. A conductor strip 54 joins the contact 52 with the socket contact or lining 51a of the socket 45a, another strip 55 joins the socket linings 51d and 51a of sockets 45a and 45b, respectively, and still another strip 56 joins the linings 51b and 51d of the sockets 45b and 45c, respectively. Finally, a strip 57 joins the lining 51f with the card contact 53. Thus, when the plugs which spell the word "Cat" are properly inserted upright in the sockets 45a, 45b, and 45c, the circuit path between the card contacts 52 and 53 is closed. The connecting strips 54, 55, 56 and 57 are all imbedded in the middle layer 47 as shown in Fig. 14.

In order that current may be passed through the circuit path between the card contacts 52 and 53, the following arrangement of a source of electric supply and feed to the said path or paths is provided, referring to Figs. 2 and 11. A connector plug 58, adapted to be plugged into a house electric outlet, is in series with a switch 59 and the primary 60 of a step-down transformer 61 to reduce the voltage in the secondary 62 to a lower and safe level. Of course, a common battery of dry cells could be substituted as a power source and thus the transformer would be dispensed with, or if a transformer is used as illustrated it could be mounted in the housing 10 distant from the housing, as is well known. Mounted in the housing under each window 20, 21 etc. is a lamp 63.

Any suitable circuit closing contacts may be provided under the top wall 16 of the housing to make contact with each associated pair of card contacts 52 and 43 when the card is properly positioned under the top member or wall. However, one such means is illustrated, and comprises for each contact 52 and 53 a unit 64 supported in openings extending upward through the card supporting strips 32, 33 or 34. As shown, the unit 64 comprises a hollow metallic shell 65 having a sleeve 66 telescopically slidable therein and urged upward by a spring 67. The locations and distribution of the units 64 are indicated in Fig. 3, so that when the card 28 is in proper position in the housing the sleeves 66 will each be in electrical contact with one of the card contacts 52 or 53. Thus, Fig. 2, taken on the irregular section line 2—2 of Fig. 3, shows the two sleeve contacts 64 under the window 22 in contact with the card contacts 52 and 53 under the same window, and also shows the two sleeve contacts 64 under the window 25 in contact with the two card contacts 52 and 53 under the latter window. For the purpose of simplifying the drawing, Fig. 2 shows the card 28 without sectioning except for the contacts 52 and 53 therein.

One terminal of the transformer secondary 62 is connected through a common lead 68 to one terminal of each of the lamps 63. The other terminal of the transformer secondary is connected to the units 64 in line with the card contacts 53 of the two rows thereof through a lead 69, and each of the units 64 under a card contact 52 is connected by its own lead 70 to the other terminal of the lamp 63 thereunder. The wiring diagram included in Fig. 2 shows how the electrical circuits are provided for the various contacts under the windows 22 and 25 included in the sectional view of Fig. 2, but it is believed quite obvious without a complete wiring diagram for the entire device to connect the various contacts 52 and 53 with their appropriate units 64 in the case of the remaining windows in the top wall 16.

It is thus apparent from the foregoing that when, for example, the word "cow" has been spelled out under the window 22 in the manner described above for the word "cat" under the window 23, the circuit will be closed between the contacts 52 and 53 under the window 22 and the lamp 63 thereunder will then be energized.

Fig. 10 shows a modified construction of the sockets 45, given the reference numeral 45a, in the card 28, which is also suitable for the purposes intended. Instead of having the eight side contacts 51a, 51b, etc. solid and imbedded or otherwise held in the sides of the polygon, they may be formed of U-shaped clips 71 frictionally secured to the middle layer 47, and those clips which are to be in circuit for a given letter are connected to a lead such as the lead 56 of Fig. 6, for example, as shown in Fig. 10.

It was stated above that the layers 47 and 48 of the card 28 are transparent or translucent. However, if the bottom layer 48 is transparent or translucent, it may be possible for a child to "cheat" by turning the card over to examine the circuit connections between the various letters after having once become familiar with the kind of circuit a given letter will fit into. It is therefore believed that it may be advisable to have the bottom layer 48 also opaque except for those areas which are positioned aligned with the areas 20a, 21a etc., or the opaque card might have areas equivalent to the above areas cut out therefrom.

It is apparent from the invention as herein exemplified, that instead of having letters of the alphabet on the plugs 41, numbers or any other symbols might be used and thus a different type of educational entertainment may be involved, with the same functional result of the device, that is, to illuminate the object picture in the given window. For example, if numbers should be used say to solve a multiplication problem, first to be worked out mentally or on paper, the product of the multiplication may be printed on the picture card or pictorial representation in the window, so that if the child places the properly numbered plugs in their proper order in the sockets the circuit through the lamp under that window will be closed to make visible to him in the picture the correct result of his efforts. Many other possible uses and adaptations of the device herein presented are obviously possible.

Cards of the type of the card 28, whether they contain a single word to be spelled or other series of symbols, are adapted to be prepared in a variety of assortments of the words and pictures associated therewith. For example, in the case of spelling words, a series of cards may be provided, beginning with a set of simple words such as illustrated in the drawings, and varying successively through a series of cards of all which might be termed "lessons" on which the words become gradually more difficult. Thus when a child has mastered the words on the first card of the series, he may take up the second card, and so on.

Since each such card is designed to have the sockets 45 thereof "wired" specifically for the words for which they are adapted, the electrical connections between the successive letters of a word are predetermined and, for a given card, or unalterable, or need not be altered. The method and means illustrated and described above for carrying the circuit between successive letters, as shown in Fig. 6, by means of the connectors or leads 54, 55, 56, and 57, merely illustrates one way in which this may be achieved, with the middle layer 47 of the card made of insulating material. Other ways to attain the same ends are possible. For example, the entire middle layer 47 may be made of conducting material which may be cut away along various lines so that the current path is interrupted by such cut out lines and is constrained to follow the metallic path between the lines; or only such portions of the middle layer may be made metallic and thus cut away along lines, each of which portions would have a width equal to the width or distance between the longitudinal edges thereof to include therein each row of card contacts 52 and 53 and the sockets 45 therebetween, the remaining portions of the middle layer being made of insulating material. An example of this modified middle layer 47 is illustrated at 47a in Fig. 15, in which by way of example only the longitudinal strip 72 thereof is assumed to be metallic. This strip is arranged with the three sockets 45 to spell the word "Cat," as in Fig. 6, the arrow in each socket 45 indicating the current path between the two prongs of each plug provided by the bridges 44 of Fig. 6. The contact units 64 are shown in their relative positions with respect to the strip 72 when the card is positioned home under the top wall of the housing. The sheet 72 is cut to provide a cut-out path or slot 73, and branches 74, 75 and 76 extend therefrom into the sockets 45 so as to cut away the metal from contact with some of the plug prongs except where such contact is desired, as shown. At its inner end the slot 77 extends downward through the lower edge of the strip 72. Additionally, upwardly extending slots (through the lower edge of the strip) having extensions around the remainder of the sides of the sockets which are not to provide a current path. It is apparent from a perusal of Fig. 15 that a current path between the two units 64 follows through the metal of the strip 72 in the direction of the arrows.

The strip 72 as shown in Fig. 15 thus provides a current path through the layer 47a when the proper plugs are inserted into their sockets in the same manner as in the structure illustrated in Fig. 6, and is an alternative thereto which may be simpler and more economical to manufacture.

It is to be noted that the upper or body portion 41a of the plugs is shown square in cross-section, so that when inserted into any socket 45 of Fig. 15 the plug body is held stably between the side walls of the slots 38 and 39 in the top wall 16, even though only two plug prongs and two socket contacts are interengaged. These slots similarly provide further stability for the inserted plugs in the case of the card illustrated in Fig. 6.

A perusal of Fig. 9 will show that in the series of twenty-six letters and two punctuation marks represented therein A, H, N, S, W and the last in line, the comma, all have the bridge 44 connecting two adjacent socket contacts. Thus, without the provision of means to prevent insertion of the plug "A" into any of the sockets intended for the other letters mentioned just above, a child who is not familiar with letters may succeed in inserting plugs into a series of sockets defining a word and thus closing the circuit through the lamp even though those inserted letters do not properly spell the word and will be in positions other than upright. Since it is intended that the present device serve to educate the child in correctly reading letters and in spelling words, it is therefore desirable that arrangements be made to prevent insertion of any but the correct plugs which serve to spell the word. One such means is illustrated in the form of a projection 78 from that side of the plug body whose upper edge is the bottom edge of the lettered top surface of the plug, and providing the lower moulding or wall 79 of the strips 38 and 39 of the top wall with complementary recesses 80. Thus, no plug is insertible into a socket without registration of the projection in the recess provided therefore, so that no plug which would be suitable electrically to close a socket gap can be inserted unless the letter or legend thereon is in upright position.

We claim:

1. A device comprising a support and a member adapted to be supported by the support, said member having a number of sockets therein, a number of plugs equal to the number of said sockets having a plurality of circumferentially equidistantly spaced prongs adapted to register in the sockets, each of said sockets having the same plurality of circumferentially equidistantly spaced metallic elements therein, each of said plugs having a different pair of the spaced prongs thereof connected by a bridge, said member including an electrical path having said sockets in series therein and normally providing gaps in said path and hence breaking the path into a series of sections, each of said sockets having a different pair of said elements thereof electrically connected to the mutually opposed ends of the sections on opposite ends of the gap provided by the socket, the angular distance between the prongs of the pair of prongs of each of the plugs being equal to the angular distance between the elements of the pair of elements of one of said sockets whereby only when a plug having a given angular distance between the bridged prongs thereof registers in a socket having the same angular displacement between the said pair of elements thereof and with each of the bridged prongs lying on the same radius of the socket as one of the elements will the bridged prongs of the plug engage the spaced pair of elements of the socket and thus close the gap in the path provided by the socket, the end sections of said path being adapted to be connected in an electrical circuit, each of said plugs including a body having the prongs thereof projecting therefrom, said body having additionally a legend thereon adapted to be correctly interpreted when in upright position as viewed by an observer looking at the device, the said upright position of the legend on each of the plugs corresponding to the position of registration of the plug in the socket wherein the bridged prongs close the gap provided by the socket as aforesaid.

2. A device according to claim 1, said member having an area thereof provided with a pictorial representation, a lamp positioned adjacent said area and connected in said circuit and adapted to be energized when all of said plugs register as aforesaid in all of said sockets to close all of said gaps in the electrical path.

3. A device comprising a housing including a top wall having a window adapted to bear a visual representation, said housing having an opening therein under the top wall, a card adapted to be passed through said opening and positioned under the top wall, means supporting said card in position under the top wall, said card having a window area therein positioned under said window when the card is in said position, a lamp mounted under said window area, said card having a plurality of spaced polygonal sockets therein positioned one adjacent the other, each of the sides of the polygonal sockets having a metallic contact thereon, the metallic contacts of each socket being insulated from each other, a number of plugs equal to the number of said sockets having prongs extending therefrom and arranged in the figure of a polygon registrable in said sockets with each of the prongs in contact with one of said metallic contacts, each of said plugs having a bridge between two of the prongs thereof, the said two bridged prongs of each of the plugs being positioned at an angle to each other which is different from the angle between the two bridged prongs of the others of said plugs, an electrical path having said sockets in series therewith and providing gaps in the path thereby breaking the path into a series of sections, each of the sections of said path except the end sections having one end thereof connected to one of the contacts in one socket and to one of the contacts in the next adjacent socket whence each of the sockets has two of the contacts thereof connected to two mutually adjacent sections of said path, the angular spacing between said two of the contacts of each of the sockets differing from that between said two contacts of the others of said sockets and being identical to the angular spacing between the two bridged prongs of one of the plugs whence the gap between any two path sections is closed only when a plug is registered in a socket having the same angular spacing between the contacts of the socket as that between the bridged prongs of the plug and when the two prongs are positioned to engage the two contacts, said end sections of the path being adapted to be connected in an electrical circuit including said lamp.

4. A device according to claim 3, said card having two feed contacts on the underside thereof spaced a given distance from each other, two similarly spaced electric contact fingers mounted in the housing in the plane of the underside of the card and positioned to engage the feed contacts when the card is positioned under the top wall as aforesaid, said fingers forming that part of said circuit which is connected to the end sections of said path.

5. A device according to claim 4, said card comprising three layers including an opaque top layer, a middle layer and a bottom layer, said sockets extending through all of said layers, said electrical path extending between the middle layer and one of the other of said layers, said feed contacts extending through said bottom layer and being in contact with said end sections of the path.

6. A device according to claim 5, said contact fingers having resilient means normally urging the same against the underside of the card.

7. A device according to claim 3, each of said plugs comprising a body having said plug prongs extending from the underside thereof, said body having a top surface bearing a legend thereon adapted to be correctly interpreted when in upright position as viewed by an observer looking at the device, the said upright position of the legend on each of the plugs corresponding to the position of registration of the plug in the socket wherein the bridged plug prongs close the gap of the socket as aforesaid.

8. A device according to claim 7, having means partly on each of said plug bodies and partly on said top wall obstructing the plug against insertion into a socket when said legend is positioned otherwise than upright.

9. A device according to claim 7, said bridge being mounted in concealed position on said body.

10. A device according to claim 1, said member comprising a plate including a top layer and a bottom layer, said sections of the electrical path comprising conductors positioned between said layers.

11. A device according to claim 1, said bridge being mounted in concealed position on said body.

12. A device according to claim 3, said card comprising a top layer and a bottom layer, said sections of the electrical path comprising conductors positioned between said layers.

References Cited in the file of this patent

UNITED STATES PATENTS

| | | |
|---|---|---|
| 2,492,571 | Goldfarb | Dec. 27, 1949 |
| 2,539,077 | Hawkins | Jan. 23, 1951 |
| 2,656,617 | Composto | Oct. 27, 1953 |